United States Patent
McCann et al.

(10) Patent No.: US 7,068,773 B2
(45) Date of Patent: Jun. 27, 2006

(54) METHODS AND SYSTEMS FOR LOAD SHARING SIGNALING MESSAGES AMONG SIGNALING LINKS IN NETWORKS UTILIZING INTERNATIONAL SIGNALING PROTOCOLS

(75) Inventors: Thomas Matthew McCann, Morrisville, NC (US); Raghavendra Gopala Rao, Morrisville, NC (US); Paul Henry Hardy, Sr., Apex, NC (US); James Arnold Young, Apex, NC (US)

(73) Assignee: Tekelec, Calabasas, CA (US)

( * ) Notice: Subject to any disclaimer, the term of this patent is extended or adjusted under 35 U.S.C. 154(b) by 698 days.

(21) Appl. No.: 10/132,110

(22) Filed: Apr. 25, 2002

(65) Prior Publication Data

US 2004/0015964 A1    Jan. 22, 2004

Related U.S. Application Data

(60) Provisional application No. 60/286,735, filed on Apr. 25, 2001.

(51) Int. Cl.
*H04M 7/00*   (2006.01)
(52) U.S. Cl. .................. 379/229; 379/230; 379/220.01
(58) Field of Classification Search ............. 379/32.03, 379/219, 220.01, 221.08, 221.1, 221.12, 379/229, 230
See application file for complete search history.

(56) References Cited

U.S. PATENT DOCUMENTS

| | | | | |
|---|---|---|---|---|
| 5,592,530 A | * | 1/1997 | Brockman et al. | 379/32.03 |
| 5,848,069 A | | 12/1998 | Milne et al. | |
| 5,912,628 A | | 6/1999 | Jeong | |
| 6,377,675 B1 | | 4/2002 | Rabourn et al. | |
| 2002/0156925 A1 | | 10/2002 | Suzuki | |

OTHER PUBLICATIONS

Travis Russell, "Signalling System#7," 3rd ed., McGraw-Hill (USA), p. 192-194, ( Sep. 19, 2000).

* cited by examiner

*Primary Examiner*—Bing Q. Bui
(74) *Attorney, Agent, or Firm*—Jenkins, Wilson, Taylor & Hunt, P.A.

(57) ABSTRACT

Methods and systems for load sharing signaling messages among signaling links in a network utilizing an international signaling protocol are disclosed. A routing node receives a signaling message formatted according to an international signaling protocol. The routing node generates a signaling link selection parameter for the signaling message. The routing node selects an outbound signaling link based on the generated signaling link selection parameter. The number of bits in the generated SLS value is user-configurable, thus allowing load sharing among arbitrary numbers of signaling links.

47 Claims, 9 Drawing Sheets

| LINKSET SELECTOR TABLE |||||
|---|---|---|---|---|
| KEY(S) | DATA FIELDS ||||
| DPC | ROUTE COST | LINKSET STATUS | ADJACENT STATUS | OVERALL STATUS | LINKSET NAME |
| 6-1-1 | 10 | A | A | A | LS1 |
| 6-1-1 | 20 | P | A | P | LS2 |
| 6-1-1 | 30 | A | A | A | LS3 |
| 7-1-1 | 10 | A | P | P | LS4 |
| 7-1-1 | 20 | A | A | A | LS5 |
| 7-1-1 | 30 | A | A | A | LS6 |

FIG.9

| LINK SELECTOR TABLE ||||
|---|---|---|
| KEY(S) || DATA FIELDS |
| SELECTION PARAMETER | LINKSET | LINK |
| 00000000 | LS1 | 15 |
| 00000001 | LS1 | 3 |
| 00000010 | LS1 | 13 |
| 00000011 | LS1 | 3 |
| 00000100 | LS1 | 6 |
| 00000101 | LS1 | 9 |
| 00000000 | LS2 | 3 |

| PHYSICAL ADDRESS TABLE | | | | |
|---|---|---|---|---|
| KEY(S) | | DATA FIELDS | | |
| LINKSET NAME | LINK NAME | IMT / CARD ADDRESS | PORT | LINK STATUS |
| LS1 | 1 | 1305 | A | A |
| LS1 | 2 | 1307 | A | A |
| LS1 | 3 | 1305 | B | A |
| LS2 | 1 | 1500 | A | U |
| LS2 | 2 | 1505 | B | U |
| LS2 | 3 | 2300 | A | U |

FIG.11

METHODS AND SYSTEMS FOR LOAD SHARING SIGNALING MESSAGES AMONG SIGNALING LINKS IN NETWORKS UTILIZING INTERNATIONAL SIGNALING PROTOCOLS

RELATED APPLICATIONS

This application claims the benefit of U.S. provisional patent application No. 60/286,735, filed Apr. 25, 2001, the disclosure of which is incorporated herein by reference in its entirety.

TECHNICAL FIELD

The present invention relates to methods and systems for load sharing among signaling links. More particularly, the present invention relates to methods and systems to load sharing signaling messages among signaling links in networks using international signaling protocols.

BACKGROUND ART

In common channel signaling networks, such as SS7 networks, adjacent nodes in a network are connected by signaling links. Signaling links are transmission lines that carry signaling messages between the adjacent nodes. For reliability and load sharing purposes, multiple signaling links may connect two adjacent nodes. Groups of signaling links that connect the same two adjacent nodes are referred to as signaling linksets.

FIG. 1 illustrates the signaling link and linkset concepts. Referring to FIG. 1, an SS7 service switching point 100 is connected to another SS7 service switching point 102 via a signal transfer point 104. In an SS7 network, service switching points perform call signaling functions and provide voice trunks for carrying media stream communications between end users. Signal transfer points route signaling messages between SS7 signaling points.

In the illustrated example, service switching point 100 is connected to signal transfer point 104 by four signaling links 106, 108, 110, and 112. Similarly, service switching point 102 is connected to signal transfer point 104 by signaling links 114, 116, 118, and 120. Signaling links 106, 108, 110, and 112 form a linkset 122. Similarly, signaling links 114, 116, 118, and 120 form another linkset 124.

When routing messages from SSP 100 to SSP 102, STP 104 must select one of signaling links 114, 116, 118, and 120. Such selection is preferably performed so that messages are evenly distributed on signaling links 114, 116, 118, and 120. In ANSI and ITU networks, signaling messages include a signaling link selection (SLS) parameter used to select the appropriate signaling link for outbound signaling messages. In ITU networks, the SLS value is 4 bits. For ITU ISUP messages, the SLS is also the lower 4 bits of the CIC.

FIG. 2 illustrates a routing label 200 of an ITU ISUP message. ISUP messages are sent between SSPs to set up and tear down calls. The routing label is a portion of a message storing information used by signal transfer points to route the message. In FIG. 2, routing label 200 includes an originating point code field 202, a destination point code field 204, and a circuit identifier code (CIC) field, including an SLS portion 206 and other CIC bits 208. OPC field 202 stores the point code of the node that originated the ISUP message. For example, in the network illustrated in FIG. 1, OPC field 202 will store the point code of SSP 100 for ISUP messages originated by SSP 100. DPC field 204 stores the destination point code of the ISUP message. Again using the example in FIG. 1, if a message is destined for SSP 102, DPC field 204 will store the point code of SSP 102. The CIC field is used to store an identifier for the circuit used to carry voice traffic. Portion 206 of the CIC field is used in ITU networks as a signaling link selection code. Other CIC bits portion 208 (bits 5–16) has not been used for signaling link selection.

One problem with using bits of the CIC code to perform signaling link selection in international networks is that one or more of the CIC bits may be fixed, which reduces the number of bits remaining for signaling link selection. For example, ITU-T Recommendation Q.764, SS7-ISDN User Part Signaling Procedures, September 1997, states that a service switching point can use either all odd or all even CICs to reduce glaring, which is a problem that occurs in telecommunications networks when two SSPs attempt to seize the same trunk at the same time. Since the CIC identifies the voice trunk, in order for an SSP to use all odd or all even trunks, the least significant bit of the CIC code is fixed. As a result, bit 16 of SLS sub-field 208 illustrated in FIG. 2 is also fixed. Because this bit is fixed, conventional signaling linkset and link selection algorithms that have relied on these four bits to select signaling links or linksets will result in unbalanced load sharing. Therefore, there exists a need for improved methods and systems for signaling link and linkset selection in international networks.

DISCLOSURE OF THE INVENTION

The present invention includes methods and systems for load sharing signaling messages among signaling links in a network utilizing an international signaling protocol, such as the ITU signaling protocol. In one method, a routing node, such as a signal transfer point, receives a signaling message formatted according to an international signaling protocol. The signal transfer point generates a signaling link selection parameter for the signaling message. The signaling link selection parameter may be generated by rotating bits of a predetermined field of the signaling message, replacing bits in a predetermined field of the signaling message, rotating and replacing bits in a predetermined field in the signaling message, or generating a random number in response to receiving the signaling message. The signaling link selection parameter is then used to select an outbound signaling link. Because the outbound signaling link is selected based on a generated parameter, rather than fixed parameter in the signaling message, load sharing among signaling links is more effectively performed.

Accordingly, it is an object of the invention to provide methods and systems for load sharing signaling messages among signaling links and networks utilizing international signaling protocols.

It is another object of the invention to provide a routing node capable of load sharing signaling messages among signaling links and networks utilizing international signaling protocols.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which:

FIG. 9 is a linkset table that may be used by a routing manager to select a linkset in a routing node according to an embodiment of the present invention;

FIG. 10 is a link selector table that may be used by a routing manager to select a link within a linkset using a generated signaling link selection parameter according to an embodiment of the present invention; and FIG. 11 is a physical address table that may be used by a routing manager to select the card address associated with an outbound signaling link according to an embodiment of the present invention.

DETAILED DESCRIPTION OF THE INVENTION

Exemplary Hardware Platform

Figure 3:
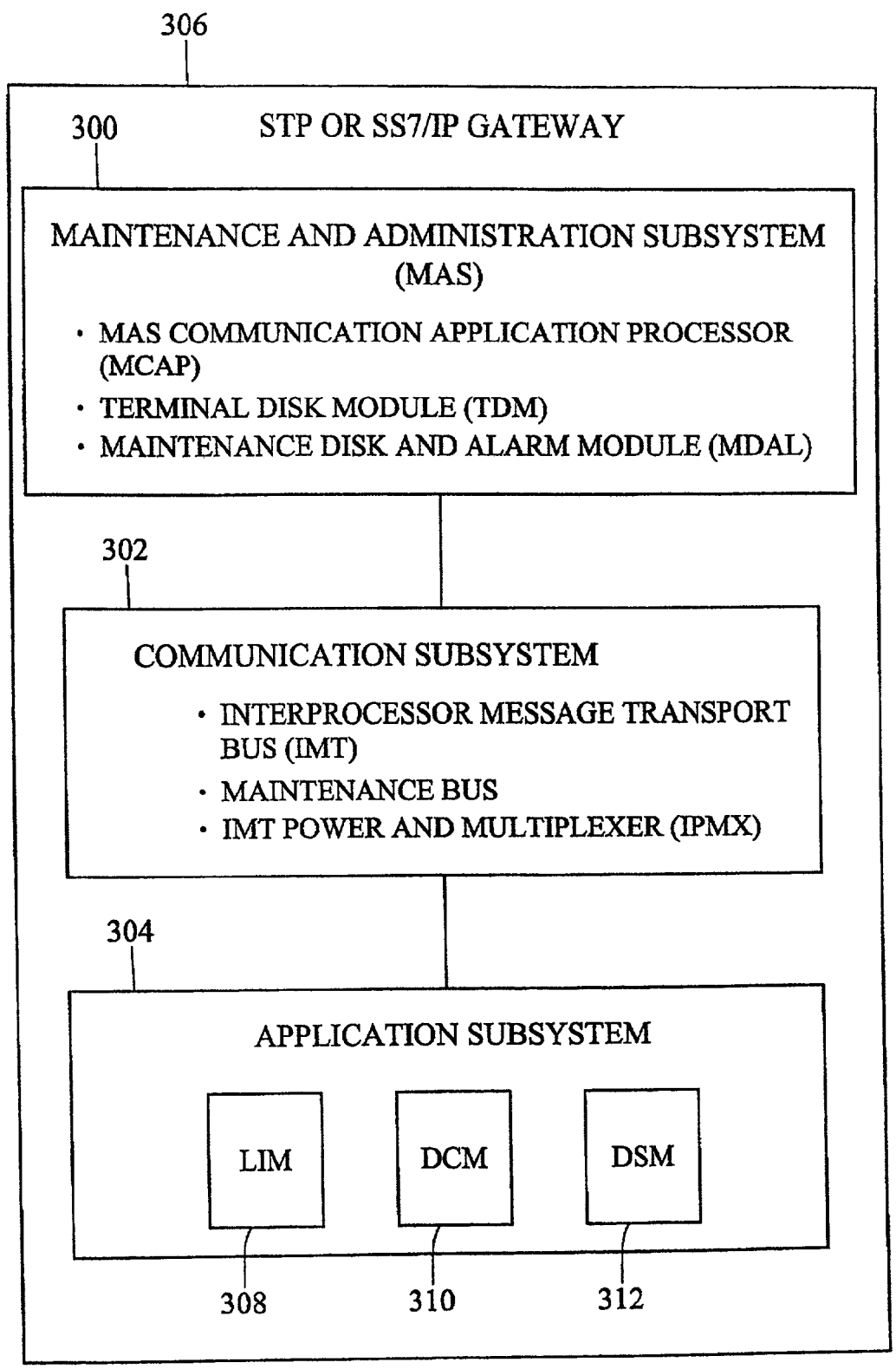
FIG. 3 is a block diagram illustrating an exemplary hardware platform suitable for use with embodiments of the present invention.

FIG. 3 is a block diagram illustrating exemplary systems and subsystems of a hardware platform on which the methods and systems for load sharing signaling messages among signaling links in networks utilizing international signaling protocols may be implemented. Referring to FIG. 3, blocks 300, 302, and 304 represent the major subsystems of an STP or SS7/IP gateway 306 on which embodiments of the present invention may be implemented. Block 300 represents a maintenance and administration subsystem that provides maintenance communications, initial program loading, peripheral services, alarm processing, and system disks. Communication subsystem 302 includes an interprocessor message transport bus for connecting processors within STP or gateway 306. Application subsystem 304 includes one or more applications that perform functionality associated with sending and receiving messages over a network, performing database lookups, etc. In the illustrated example, application subsystem 304 includes a link interface module for sending and receiving SS7 messages over an SS7 network, a data communications module 310 for sending and receiving SS7 messages over an IP network, and a database services module 312 for performing database related services, such as global title translation and number portability.

Figure 4:
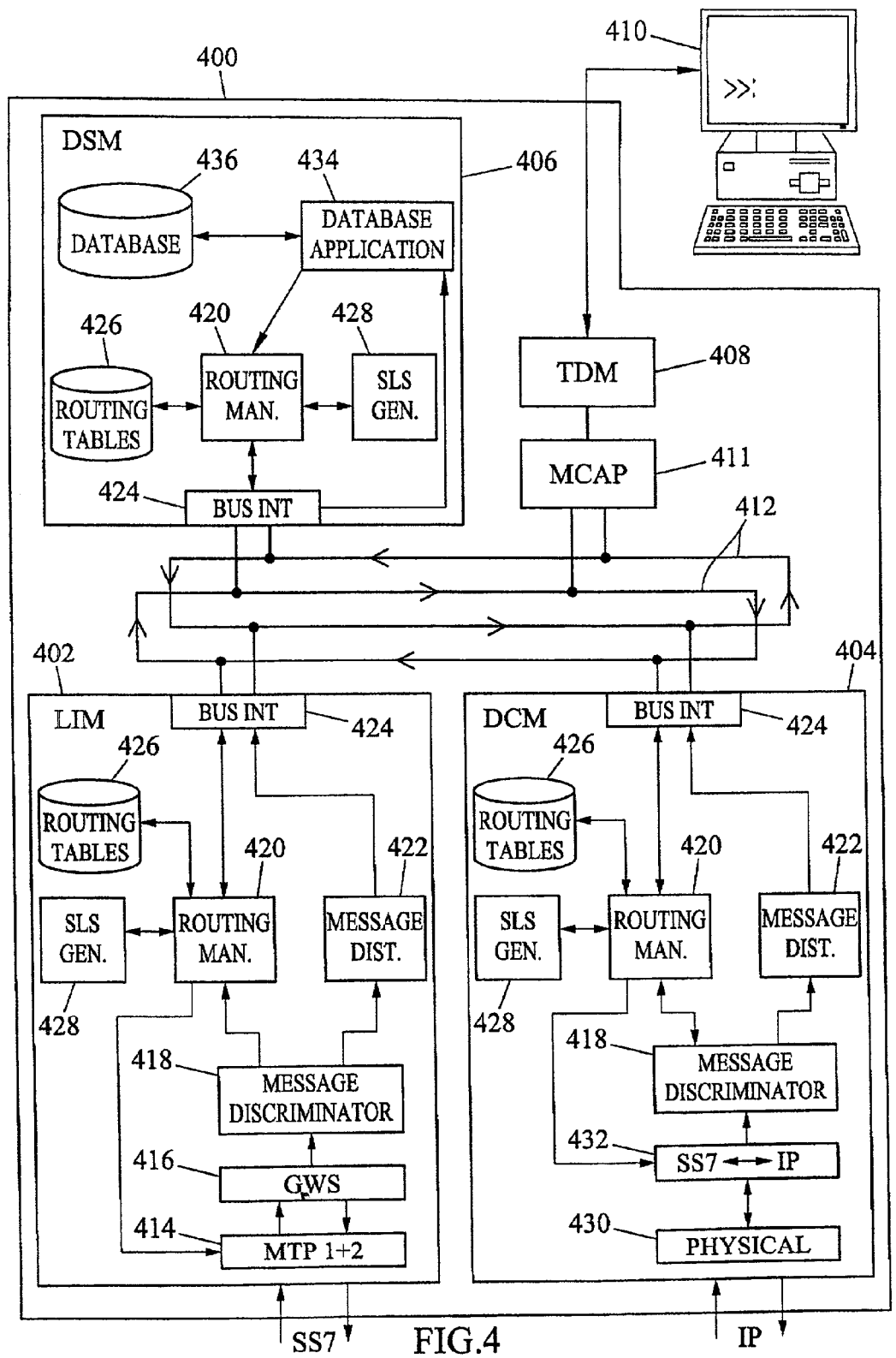
FIG. 4 is a block diagram of a signal transfer point with signaling link selection parameter generation capabilities according to an embodiment of the present invention.

FIG. 4 illustrates in detail a routing node having a signaling link selection parameter generator according to an embodiment of the present invention. In FIG. 4, routing node 400 includes a link interface module 402 for interfacing with SS7 signaling links, a data communications module 404 for interfacing with Internet protocol signaling links, a database services module 406 for providing database services, such as LNP or GTT, a terminal disk module 408 for interfacing with one or more external terminals 410, and a maintenance and administration subsystem communication application processor 411 for performing database provisioning and other maintenance related services. From a hardware perspective, modules 402, 404, 406, 408, 410, and 411 may each include a printed circuit board with one or more microprocessors mounted thereon. A pair of dual-ring, counter-rotating buses 412 reliably connect the modules and processors illustrated in FIG. 4.

LIM 402 includes a plurality of sub-modules or processes that send and receive SS7 messages. The sub-modules or processes of LIM 402 may be implemented in hardware, software, firmware, or any combination thereof. In the illustrated example, LIM 402 includes a message transfer part level 1 and 2 function 414. MTP level 1 and 2 function 414 performs MTP level 1 and 2 operations, such as receiving messages over a particular physical medium, performing error detection and error correction, and performing message sequencing. Gateway screening module 416 screens incoming messages based on destination point code values in the messages to determine whether the messages should be allowed into a service provider's network. Message discriminator 418 determines whether an incoming message is addressed to routing node 400 or should be through-switched. If message discriminator 418 determines that a message is to be through-switched, the message is passed to routing manager 420. If message discriminator 418 determines that a message is addressed to routing node 400, message discriminator 418 sends the message to message distributor 422 for distribution to one of the other processing modules within routing node 400. Message discrimination, distribution, and routing are typically referred to as MTP level 3 functions performed by LIM 402. A bus interface 424 controls the sending and receiving of messages via buses 412.

For messages that are to be routed to another node or through-switched, routing manager 420 performs a lookup in routing tables 426 to select the linkset, link, and module or card for an outbound signaling message. According to an important aspect of the invention, signaling link selection generator 428 generates a signaling link selection parameter used to select a signaling link within a linkset for outbound signaling messages. By "generates," it is meant that SLS generator 428 formulates a new SLS value that is different from the SLS value included in an outbound signaling message. Exemplary methods for generating this new SLS value will be discussed in detail below. SLS generator 428 eliminates the aforementioned problems that occur when a service provider fixes one or more bits of the SLS parameter in signaling messages.

DCM 404, like LIM 402, includes a message discriminator 418, a routing manager 420, a message distributor 422, a bus interface 424, routing tables 426, and an SLS generator 428. However, rather than having lower layer SS7 functions for interfacing with an SS7 network, DCM 404 includes a physical layer 430 and a bi-directional SS7/IP converter 432 for sending and receiving SS7 messages over an IP network. Physical layer 430 may include hardware and software for communicating over any suitable physical network capable of carrying IP packets, such as an Ethernet, fast Ethernet, or SONET. SS7/IP converter 432 preferably includes hardware and/or software for sending and receiving IP datagrams, converting the IP datagrams to SS7 MSUs, receiving SS7 MSUs, and encapsulating received SS7 MSUs in IP datagrams. Exemplary protocols that may be implemented by SS7/IP converter 432 include Tekelec's transport adapter layer interface running over TCP or the IETF signaling user adaptation layers running over the stream control transmission protocol.

Database services module 406 performs database processing for messages that were addressed to routing node 400. Accordingly, database services module 406 includes a database application 434 and one or more databases 436. Database application 434 may be any suitable database application for processing signaling messages, such as a local number portability application. Database 436 stores the corresponding data. Once a received signaling message has been processed by database application 434, database application 434 forwards the message to routing manager 420 of database services module 406 for routing to the appropriate outbound signaling link. Like LIM 402 and DCM 404, DSM 406 includes routing tables 426 for selecting the outbound signaling linkset and the link and SLS generator 428 for generating an SLS value to be used in selecting the outbound signaling link.

Terminal disk module 408 includes hardware and/or software for terminal 410 to access databases and tables within routing node 400. Terminal disk module 408 may implement any suitable protocol for communicating with an external terminal, such as VT100. MCAP 411 includes one or more processors for implementing administration commands received by terminal 410. Such commands may include database provisioning commands and feature activation and modification commands. Specific commands associated with SLS generation and signaling link selection will be discussed in more detail below.

Exemplary signaling link selection algorithms performed by SLS generator 428 according to embodiments of the present invention include:
1. "Bit Rotation"—The 4 bits of the SLS are rotated thus changing the LSB of the SLS.
2. "Use of Other CIC Bit(s)"—The SLS is derived from bits 2–4 of the CIC to serve as the three lower bits of SLS, and one other bit of the CIC serves as the MSB of the SLS. Additional CIC bits may be appended or pre-pended to the SLS to increase the number of signaling links capable of being randomly selected.
3. "Random"—The SLS used for link selection is randomly generated.

In each of the signaling link selection generation techniques listed above, the generated SLS value is preferably only used internally within routing node 400 to perform signaling link selection. The SLS field of the message that is routed over the outbound signaling link is preferably not modified. Each of the above-listed signaling link selection parameter generation algorithms will now be described in more detail.

Generating an SLS Parameter Using Bit Rotation

Figure 1:
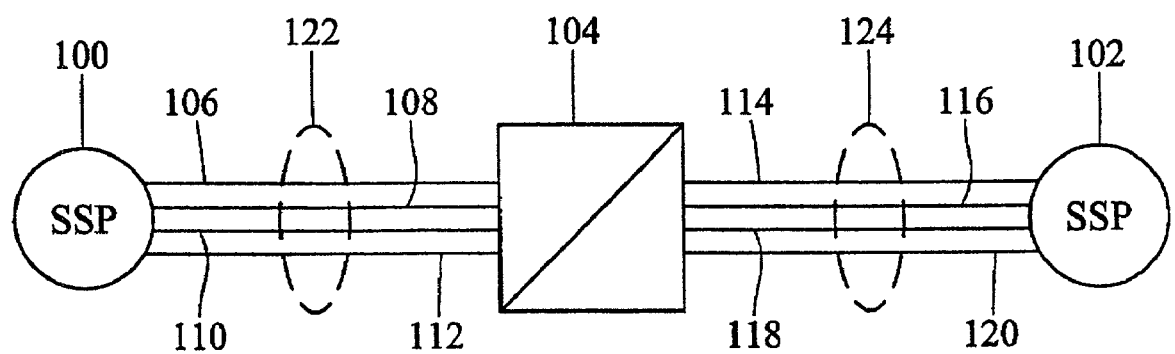
FIG. 1 is a block diagram of a conventional signaling network illustrating signaling links and signaling linksets.
Figure 2:
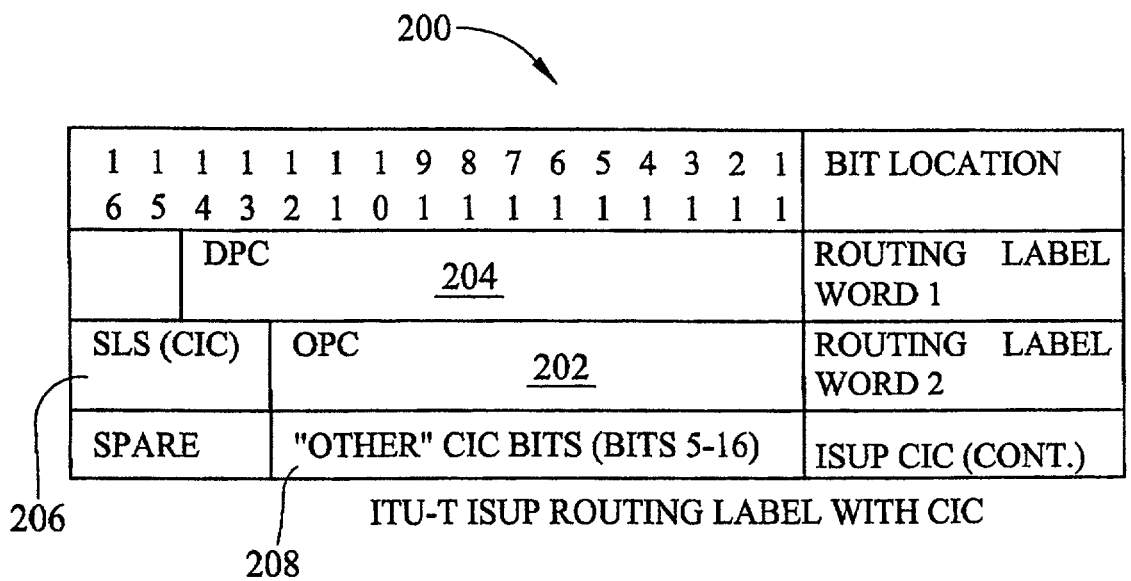
FIG. 2 is a message structure diagram illustrating the routing label of an ITU ISUP message and bits conventionally used to perform signaling link selection.

According to one embodiment of the present invention, SLS generator 428 generates SLS parameters on a per linkset basis by rotating one or more bits in a received SLS message. As discussed above with regard to FIG. 2, ITU ISUP messages include a 4-bit SLS value consisting of the lowest order 4 bits of the CIC value. The lowest order bit is often fixed by the network operator to reduce glaring. Since the lowest order bit is used to select an outbound linkset and this value is fixed, without the present invention, signaling messages in which the lowest order CIC bit is fixed would go to the same linkset. Accordingly, it may be desirable to move the lowest order bit to another location in the generated SLS parameter value. Bit rotation is one method for moving the lowest order bit.

The present invention may enable, via terminal 410, a telecommunications service provider to select which bit (1–4) of the SLS field to use as the LSB for linkset selection. For example, terminal 410 may provide a command line interface through which the service provider may enter a CHG-LS (change link selection) or ENT-LS (enter link selection) command and appropriate parameters to select the bit rotation option and which bit or bits will be rotated to the lowest order position. This rotation affects the 4 bits of the generated SLS value as follows:

If bit 4 is selected, then bit locations 4 3 2 1 will be rotated to 3 2 1 4
  For example: SLS=0110 becomes Rotated SLS=1100
    SLS=1011 becomes Rotated SLS=0111
If bit 3 is selected, then bit locations 4 3 2 1 will be rotated to 2 1 4 3
  For example: SLS=0110 becomes Rotated SLS=1001
    SLS=1011 becomes Rotated SLS=1110
If bit 2 is selected, then bit locations 4 3 2 1 will be rotated to 1 4 3 2
  For example: SLS=0110 becomes Rotated SLS=0011
    SLS=1011 becomes Rotated SLS=1101
If bit 1 is selected, then no rotation is performed since bit 1 is the existing LSB. Bit 1 is the default value.

Once bit rotation is complete, the new rotated bit sequence may be used to select the outbound signaling linkset and link.

Figure 5:
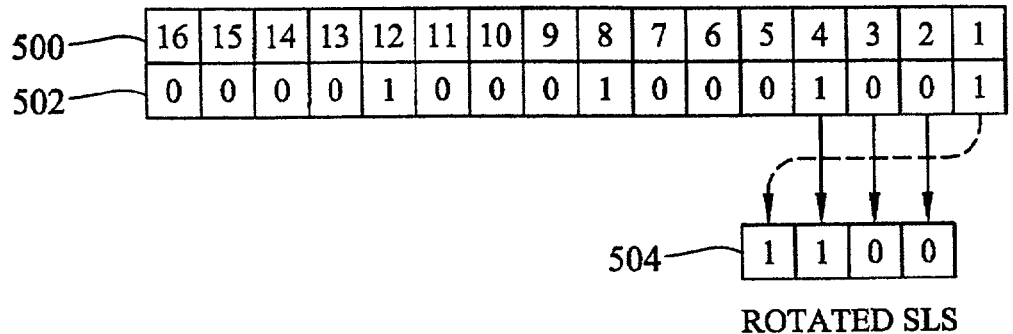
FIG. 5 is a block diagram illustrating an exemplary bit rotation algorithm that may be used by a signaling link selection parameter generator according to an embodiment of the present invention.

FIG. 5 illustrates in detail bit rotation that may be performed by an SLS generator 428 according to an embodiment of the present invention. In FIG. 5, the first row 500 represents the bit locations of the CIC value in a received ITU ISUP message. Row 502 represents the corresponding bits for each bit position. In the example illustrated in FIG. 5, it is assumed that the telecommunications service provider has selected bit 2 to replace bit 1 in the rotated or generated SLS. Accordingly, bits 504 represent the generated SLS value where former bit position 2 is now the least significant bit.

Rotating the fixed LSB of an SLS value prevents signaling messages from always being sent over the same linkset. This results in effective load sharing among linksets when two nodes are connected by more than one linkset. However, because the fixed bit is rotated to another position in the SLS value, even load sharing among links within a linkset may not occur. Accordingly, in order to provide effective load sharing among signaling links, the fixed bit may be replaced or discarded. A method for replacing the LSB with one or more of the other CIC bits will now be described.

Generating an SLS Parameter Using other CIC Bit(s)

According to another embodiment of the invention, SLS generator 428 may utilize one or more of the remaining bits in the CIC value of a received signaling message to generate the SLS value used to select the outbound signaling link. The use of another CIC bit in generating the SLS may be configurable by a telecommunications service provider via terminal 410. For example, the above-referenced CHG-LS and ENT-LS commands may allow a telecommunications service provider to select the "Use of Other CIC Bit(s)" option and which bit(s) (bits 5 through 16 of CIC) is or are to be used as the "other CIC bit(s)." During link selection, the specified bit will act as the most significant bit (MSB) of the new SLS and bits 2 through 4 of the received CIC become the least significant bits (LSBs) of the new SLS. The LSB, which is fixed, is not used.

Figure 6:
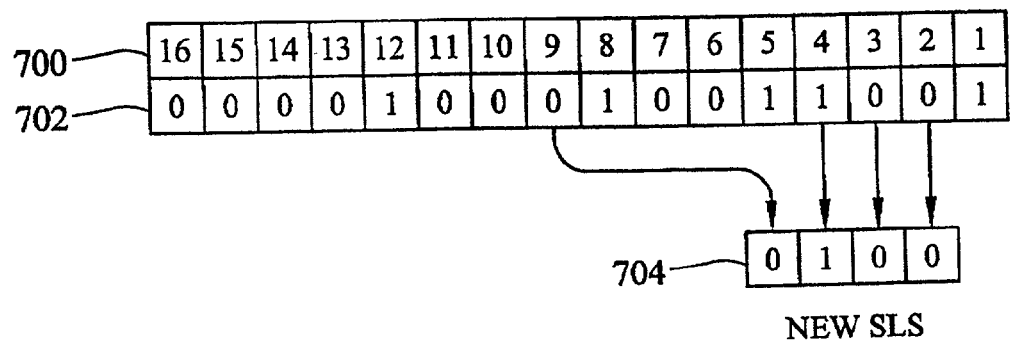
FIG. 6 is a block diagram illustrating an exemplary signaling link bit replacement algorithm that may be used by a signaling link selection parameter generator according to an embodiment of the present invention.

FIG. 6 illustrates an exemplary algorithm that may be used by SLS generator 428 in generating an SLS value using other CIC bits in a received signaling message. Referring to FIG. 6, row 700 represents bit positions of CIC bits in a received signaling message. Row 702 represents the corresponding bit values. In this example, it assumed that the customer or telecommunications service provider has selected bit 9 of the CIC code as the other CIC bit. Bits 704 represent the generated SLS. Because bit 9 is not fixed and the least significant bit of the CIC code is not used, all of the bits in the generated SLS value are variable. Accordingly, the method illustrated with regard to FIG. 6 may result in even load sharing among outbound signaling links.

Although the example illustrated with regard to FIG. 6 includes using a single additional CIC bit to generate the new SLS, the present invention is not limited to such an embodiment. For example, in an alternate embodiment of the invention, multiple CIC or other bits may be added to the received SLS value to produce the generated SLS value. It may be desirable to use more than one additional CIC bit when the number of signaling links exceeds the base 2 logarithm of the number of bits available for link selection. For example, if there are 32 signaling links within a linkset, $\log_2(32)=5$, and therefore there are preferably at least 2 other CIC bits in the generated SLS value.

Combining "Bit Rotation" and "Use of other CIC Bit"

In another embodiment, SLS generator 428 may use both the "Bit Rotation" option and the "Use of Other CIC Bit(s)" options to provide an even distribution of ITU ISUP messages on outbound signaling links. In such a scenario, link selection processing may be performed in the following order.
1. The SLS is modified using "Other CIC Bit(s)" option.
2. The modified SLS is modified again using the "Bit Rotation" option.
3. The modified SLS is used by the existing linkset and link selection algorithms to select a link and linkset.
4. The message is sent out the link containing the original, unmodified SLS field.

Random SLS Generation

In yet another alternative embodiment, SLS generator 428 may generate a random number or select a previously generated random number for the new SLS value. Unlike the embodiments described above, using a random number for the new SLS value does not ensure that signaling messages associated with the same call will follow the same signaling link. As a result, signaling messages for which a random SLS values are generated may be delivered to the destination node in a different sequence from the sequence in which the messages were sent. For ISUP messages, message sequencing is preferably preserved. However, for non-ISUP messages, such as SCCP, TCAP, and MAP messages, sequencing may not be required, since database transactions that use these message types typically only involve one message being sent in each direction (a query and a response). Accordingly, using a randomly generated SLS value may be used for load sharing non-ISUP messages.

SLS generator 428 may use any suitable method for generating random SLS values. For example, SLS message generator may generate a random number on the fly for each outbound signaling message. If SLS generator 428 generates random numbers on the fly, SLS generator 428 preferably includes random number generation hardware to generate random numbers at line speed or near line speed. In an alternate embodiment, a table of random numbers may be generated in advance and stored in memory accessible by SLS generator 428, and SLS generator 428 may sequentially select random numbers from the table for outbound signaling messages.

Figure 7:
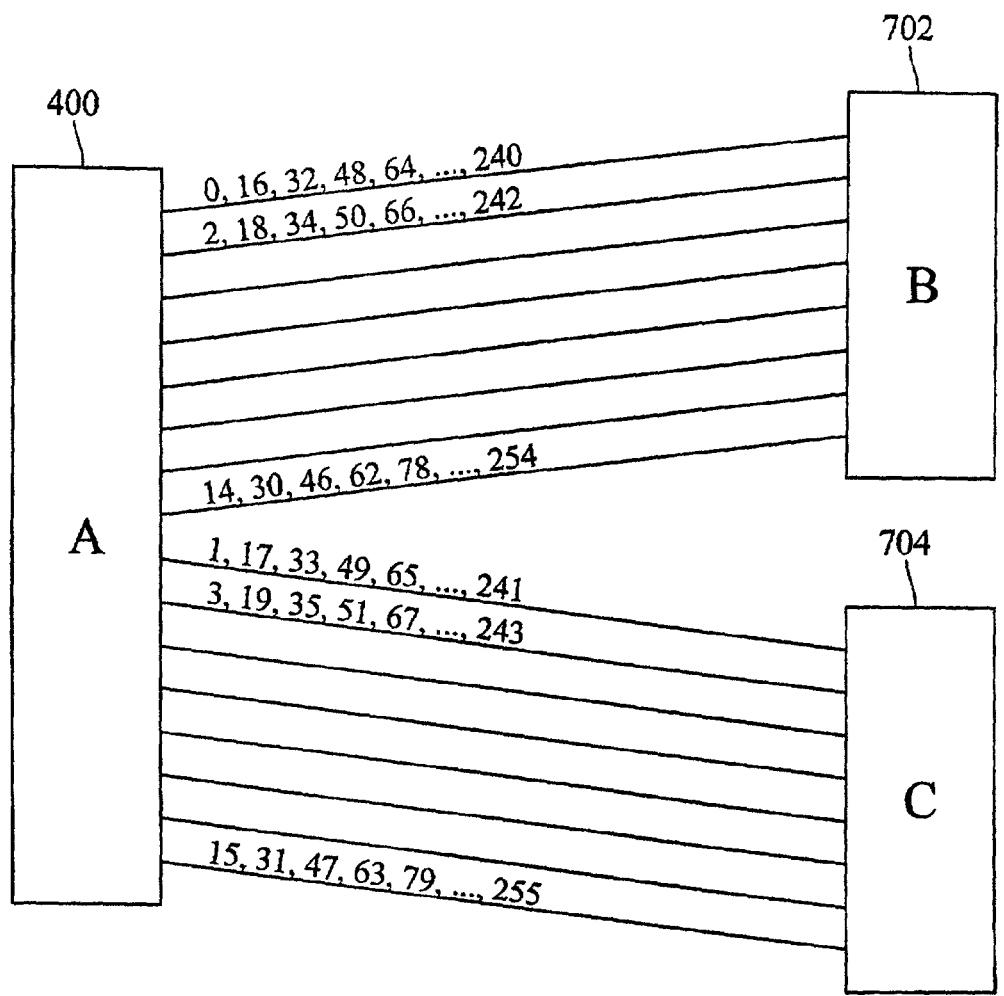
FIG. 7 is a block diagram illustrating random SLS mapping to a combined linkset according to an embodiment of the present invention.

FIG. 7 illustrates an example of how randomly generated SLS values can be used to perform load balancing of signaling messages over a combined linkset. In FIG. 7, routing node 400 is connected to nodes 702 and 704 via a combined linkset. A combined linkset is a group of linkset that connects adjacent nodes. Nodes 702 and 704 may be a mated pair of signal transfer points. Each line connecting routing node 400 to one of nodes 702 and 704 represents a signaling link within the combined linkset. In the illustrated example, 16 signaling links are illustrated. Accordingly, SLS generator 428 preferably generates random numbers of at least 4 bits in length.

In the illustrated example, it is assumed that SLS generator 428 generates 8-bit random numbers, resulting in $2^8$ or 256 random numbers ranging from 0×00 to 0×FF or 0 to 255 in decimal. Accordingly, to ensure even load sharing, each of the 16 signaling links is preferably assigned 16 unique numbers in the 256 number range. In operation, SLS generator 428 generates random 8 bit signaling link selector values and the generated signaling link selector values are mapped to the outbound signaling link assigned to the generated value.

Another feature and advantage of the invention with regard to combined linksets is the ability to load share among greater than 16 links in a combined linkset. As discussed above with regard to FIG. 7, a combined linkset is a group of linksets that connects adjacent nodes. In ITU networks, because the SLS only has 4 bits, the maximum number of signaling links for which load sharing can be performed is 16. Because the present invention can generate an SLS value having a user-configurable number of bits, the number of signaling links for which load sharing can be performed can be greater than 16. In particular, if there are n SLS bits in the generated SLS value, load sharing can be effectively performed among $2^n$ signaling links in a combined linkset. Any of the methods described herein can be used to generate the n bits used to load share among signaling links in the combined linkset.

Figure 8:
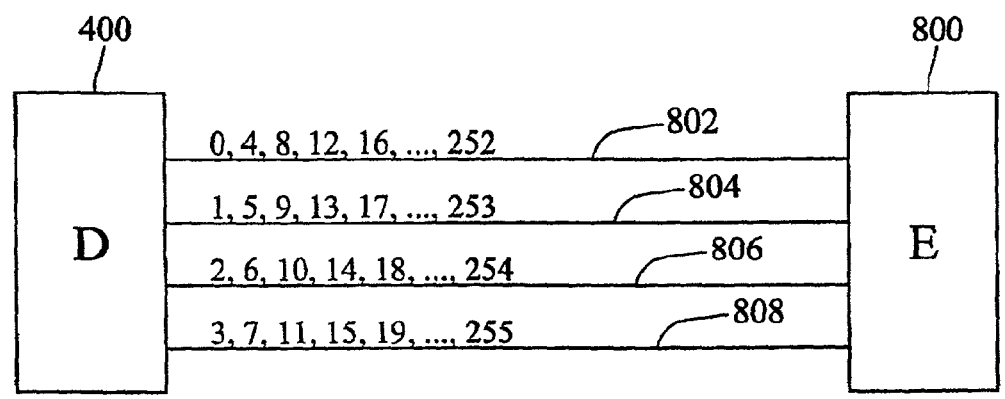
FIG. 8 is a block diagram of random SLS mapping to a single linkset according to embodiment of the present invention.

While the example illustrated in FIG. 7 included using random signaling link selection parameter generation to select a signaling link in a combined linkset, FIG. 8 illustrates using randomly generated SLS values to select a link in a single linkset between two connected nodes. In FIG. 8, nodes 400 and 800 are connected by four signaling links 802, 804, 806, and 808. Signaling links 802, 804, 806, and 808 form a linkset. If SLS generator 428 associated with node 400 generates 8 bit random values, each signaling link 802, 804, 806, and 808 is preferably assigned 64 unique numbers in the range from 0–255. Assigning numbers in this way will result in even load sharing among signaling links 802, 804, 806, and 808. It will be noted that while only 4 signaling links are present, using 8-bit values allows up to 255 signaling links to be randomly selected. Accordingly, present embodiment removes the number of SLS bits as a limitation on the number of links or linksets that may be used to connect adjacent nodes.

FIGS. 9–11 illustrate exemplary routing tables 426 that may be used to select outbound signaling links and linksets according to an embodiment of the present invention. More particularly, FIG. 9 is a linkset selector table illustrating exemplary keys and data fields used to select an outbound linkset for a signaling message. Referring to FIG. 9, linkset selector table 900 may be keyed by destination point code field in a received message. If multiple linksets exist in the routing table for the same DPC, the lowest order bit of the SLS value may be used to select the outbound linkset, as discussed above. Route cost, link status, adjacent status, and overall status fields may also be used by routing manager 420 select the appropriate outbound linkset. For example, routing manager may select the linkset with the lowest routing cost if multiple choices exist for the same DPC. The result of the lookup in the linkset selector table 900 is the name of an outbound linkset.

Referring to FIG. 10, link selector table 1000 includes keys and data fields associated with selecting a signaling link within a linkset. More particularly, link selector table 1000 includes a selection parameter field that contains selection parameters corresponding to the SLS values generated by SLS generator 428. The linkset field corresponds to the linkset. In the example illustrated in FIG. 10, generated SLS parameters are assigned to outbound signaling links on a per linkset basis. Accordingly, in order to extract an outbound signaling link from selector table 1000, routing manager 420 may utilize the linkset identifier extracted from the linkset table to select a group of signaling link entries for a particular linkset and then use the generated SLS value to select a signaling link entry from the entries for the selected linkset. The result of the lookup in Table 10 is a signaling link over which the outbound signaling message is to be routed.

While the embodiment illustrated in FIG. 10 includes ordered selection parameter values, the present invention is not limited to such an embodiment. In an alternate embodiment, randomness may be built into link selector table 1000 by randomly generating selection parameters to be included in the selection parameter field in advance. The ordered selection parameters illustrated in FIG. 10 may be replaced by a sequence of randomly generated numbers generated by a random number generator. The SLS value in a received signaling message could simply be read from the message and used to perform a lookup in link selector table 1000. Real-time random number generated would not be required in such an embodiment. However, as stated above, such random selection is preferably only used for messages for which sequencing is not required, such as SCCP, TCAP, and MAP messages. For ISUP messages, one of the above-described CIC-based algorithms is preferably used so that ISUP messages related to the same call are delivered in sequence.

Once a link and a linkset are selected, a lookup is performed in a physical address table to locate the bus address of the card corresponding to the outbound signaling link. FIG. 11 illustrates an example of a physical address table 1100 according to an embodiment of the present invention. In FIG. 11, physical address table 1100 is keyed by the linkset and link names extracted from the linkset and link tables illustrated in FIGS. 9 and 10. The result of the lookup in physical address table is an IMT bus address corresponding to the outbound signaling link. If the outbound card is different from the inbound card, the message may be routed to the outbound card over the IMT bus. The signaling link selected by the inbound card may be communicated to the outbound card in the packet header used to send the message over the IMT bus. If the outbound card is the same as the inbound card, the message is simply forwarded over the outbound signaling link.

The methods and systems described herein for selecting an outbound signaling links may be used when the underlying network is SS7 or IP. If the underlying network is SS7, once a signaling link is selected, the routing manager on the outbound card passes the message to MTP layers 1 and 2, and the message is sent over the selected SS7 signaling link. If the underlying network is IP, the selected SS7 signaling link may be a logical link associated with a TCP/IP connection with an adjacent node. Accordingly, the routing manager on the outbound card may send the message to the SS7-IP conversion layer, and the message may then be sent over the network via the TCP, IP and physical layers.

Thus, by using the signaling link selection parameter generation methods described herein, load sharing among outbound signaling links can be performed even when one or more bits of a signaling link selection parameter in a received call signaling message is fixed. Because the signaling link selection parameter generation methods described herein preferably only function internally to a routing node, the protocol of the network in which the routing node is inserted not altered.

The present invention greatly increases load sharing in networks with multiple STPs on different hirearchical levels. In convetional hierarchical ITU networks, the path through the network for a particular message is limited by the fixed number of bits in the SLS value. For example, suppose a message enters the network at a first STP in the lowest level in the hierarchy. The message is routed to another STP at the next level, then to the next level, and so forth, until the message reaches the highest level. The message then proceeds back down to the hierarchy to an STP at the lowest level, which routes the message to the destination. If conventional fixed 4-bit ITU SLS values are used, the inefficiency in load sharing is magnified as the message proceeds through the network because destination STPs are limited at each level. Because the methods decribed herein allow SLS values of arbitrary length to be generated and used, heirarchical networks of STPs can be constructed and messages can be efficiently load shared among signaling links in such networks.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for load sharing signaling messages among signaling links in a network utilizing an international signaling protocol, the method comprising:
  (a) receiving a signaling message formatted according to an international signaling protocol and including a first signaling link selection parameter;
  (b) generating a second signaling link selection parameter for the signaling message, the second signaling link selection parameter being different from the first signaling link selection parameter; and
  (c) selecting an outbound signaling link for the signaling message based on the generated second signaling link selection parameter.

2. The method of claim 1 wherein receiving a signaling message formatted according to an international signaling protocol includes receiving an ITU ISUP message having a CIC parameter.

3. The method of claim 2 wherein generating a second signaling link selection parameter includes generating the second signaling link selection parameter based on predetermined bits of the CIC parameter.

4. The method of claim 3 wherein generating the second signaling link selection parameter based on predetermined bits of the CIC parameter includes rotating the predetermined bits of the CIC parameter.

5. The method of claim 3 wherein generating the second signaling link selection parameter based on predetermined bits of the CIC parameter includes replacing at least one of the predetermined bits of the CIC parameter.

6. The method of claim 3 wherein generating the second signaling link selection parameter based on predetermined bits of the CIC parameter includes replacing one of the predetermined bits of the CIC parameter and rotating resulting bits of the second SLS parameter.

7. The method of claim 1 wherein generating a second signaling link selection parameter for a signaling message includes generating a random number and wherein selecting an outbound signaling link includes selecting an outbound signaling link based on the random number.

8. The method of claim 7 wherein generating a random number includes generating a random number on the fly in response to receiving the signaling message.

9. The method of claim 7 wherein generating a random number includes selecting a random number from a table of pre-generated random numbers.

10. The method of claim 7 comprising assigning predetermined numbers or ranges of numbers to outbound signaling links and wherein selecting an outbound signaling link for the signaling message includes matching the generated random number to one of the numbers or ranges of numbers.

11. The method of claim 1 wherein selecting an outbound signaling link includes selecting an outbound SS7 signaling link.

12. The method of claim 1 wherein selecting an outbound signaling link comprises selecting a logical SS7 signaling link associated with an IP-based connection with an adjacent node.

13. The method of claim 1 comprising providing a user interface for configuring generation of the second signaling link selection parameter.

14. The method of claim 13 wherein providing a user interface includes providing commands for allowing a user to select bits to be used in generating the second signaling link selection parameter.

15. The method of claim 13 wherein providing a user interface includes providing commands for allowing a user to select bit rotation options to be used in generating the second signaling link selection parameter.

16. The method of claim 1 wherein selecting an outbound signaling link for the signaling message based on the generated second signaling link selection parameter includes using the second signaling link selection parameter internally within a signaling message routing node to select the outbound signaling link and wherein the method further comprises routing the signaling message over the outbound signaling link without modifying the first SLS value in the message.

17. A signal transfer point comprising:
(a) a communication module for sending and receiving signaling messages formatted according to an international signaling protocol over a plurality of SS7 signaling links, the received signaling messages having first signaling link selection (SLS) values;
(b) an SLS generator operatively associated with the communication module for generating second SLS values, at least some of which are different from the corresponding first SLS values, for the received signaling messages formatted according to the international signaling protocol; and
(c) a routing manager operatively associated with the communication module for selecting, based on each of the second SLS values, one of the plurality of SS7 signaling links for transmitting each received signaling message.

18. The signal transfer point of claim 17 wherein the SLS generator is adapted to generate the second signaling link selection values based on CIC bits in the received signaling messages.

19. The signal transfer point of claim 18 wherein the SLS generator is adapted to generate the second signaling link selection values by bit-rotating the CIC bits.

20. The signal transfer point of claim 18 wherein the SLS generator is adapted to generate the second signaling link selection values by selecting a first group of CIC bits from each message and an at least one bit from a second group of CIC bits from each message.

21. The signal transfer point of claim 17 wherein the SLS generator is adapted to generate the second signaling link selection values based on random numbers.

22. The signal transfer point of claim 21 wherein the SLS generator is adapted to generate the random numbers on the fly in response to receiving each signaling message.

23. The signal transfer point of claim 21 wherein the SLS generator is adapted to select each second SLS value from a table of randomly generated SLS values in response to receiving each signaling message.

24. The signal transfer point of claim 17 wherein the international signaling protocol is an ITU protocol.

25. The signal transfer point of claim 17 comprising a user interface for configuring generation of the second SLS values.

26. The signal transfer point of claim 25 wherein the user interface includes commands for allowing an end user to control bits to be included in the second SLS values.

27. The signal transfer point of claim 26 wherein the commands allow the end user to control positions of the bits to be included in the second SLS values.

28. The signaling transfer point of claim 17 wherein the routing manager is adapted to use the second SLS values internally within the signal transfer point to select the signaling links for transmitting the received signaling messages and wherein the first SLS values in the received signaling messages that are transmitted over the signaling links are not modified.

29. A signaling message routing node comprising:
(a) a first communication module for sending and receiving signaling messages formatted according to an international signaling protocol over SS7 signaling links, the signaling messages received by the first communication module having first signaling link selection (SLS) values;

(b) a second communication module for sending and receiving signaling messages formatted according to the international signaling protocol over an IP signaling link;

(c) an SLS generator operatively associated with the first communication module for generating second SLS values for the received signaling messages formatted according to the international signaling protocol, at least some of the second SLS values being different from the corresponding first SLS values; and (d) a routing manager operatively associated with the first communication module for selecting, based on each of the second SLS values, one of a plurality of logical SS7 signaling links associated with the IP signaling link for transmitting each received signaling message.

30. The signaling message routing node of claim 29 wherein the second communication module is adapted to send and receive the signaling messages using IETF signaling user adaptation layers running over stream control transmission protocol.

31. The signaling message routing node of claim 29 wherein the second communication module is adapted to send and receive the signaling messages using a transport layer adapter interface.

32. The signaling message routing node of claim 29 wherein the SLS generator is adapted to generate the second SLS values by rotating predetermined bits of the received signaling messages.

33. The signaling message routing node of claim 32 wherein the predetermined bits comprise CIC bits extracted from the received signaling messages.

34. The signaling message routing node of claim 29 wherein the SLS generator is adapted to generate the second SLS values by selecting predetermined bits from first and second bit groups extracted from the received signaling messages.

35. The signaling message routing node of claim 29 wherein the first and second bit groups include an SLS portion of a CIC code and remaining bits of the CIC code.

36. The signaling message routing node of claim 35 wherein the SLS generator is adapted to rotate the bits selected from the first and second bit groups in generating each second SLS value.

37. The signaling message routing node of claim 29 wherein the SLS generator is adapted to generate each of the second SLS values based on a random number.

38. The signaling message routing node of claim 37 wherein the SLS generator is adapted to generate random numbers used for the second SLS values on the fly in response to each received signaling message.

39. The signaling message routing node of claim 37 wherein the SLS generator is adapted to select a random number from a table of previously generated random numbers for each received signaling message.

40. The signaling message routing node of claim 29 wherein the international signaling protocol includes and ITU signaling protocol.

41. The signaling message routing node of claim 29 comprising a user interface for end user configuration of generation of the second SLS values.

42. The signaling message routing node of claim 41 wherein the user interface allows the user to select bits to be included in the second SLS values.

43. The signaling message routing node of claim 42 wherein the user interface allows the user to select positions of the bits to be included in the second SLS values.

44. The signaling message routing node of claim 29 wherein the routing manager is adapted to select the logical SS7 signaling links using the second SLS values internally within the signaling message routing node and wherein the first SLS values in the received signaling messages that are transmitted over the logical SS7 signaling links are not modified.

45. A computer program product comprising computer executable instructions embodied in a computer-readable medium for performing steps comprising:

(a) receiving user input regarding a number of bits n to be included in a generated signaling link selection (SLS) value, n being an integer greater than four;

(b) receiving signaling messages formatted according to an international signaling protocol and destined for outbound signaling links in a combined linkset having $2^n$ signaling links, the received signaling messages having first SLS values;

(c) for each received signaling message, generating a second SLS value having at least n bits, at least some of the second SLS values being different from the corresponding first SLS values; and (d) load sharing the signaling messages among the $2^n$ signaling links in the combined linkset using the second SLS values.

46. The computer program product of claim 45 wherein load sharing the signaling messages among the $2^n$ signaling links includes routing the signaling messages between STPs at different hierarchical levels over the signaling links.

47. The computer program product of claim 45 wherein selecting an outbound signaling link for the signaling message based on the generated second signaling link selection parameter includes using the second signaling link selection parameter internally within a signaling message routing node to select the outbound signaling link and wherein the method further comprises routing the signaling message over the outbound signaling link without modifying the first SLS value in the message.

* * * * *